358-86. XR 3,130,396 SR

SEARCH ROOM

April 21, 1964 J. W. HUGHES ETAL 3,130,396

AUTOMATIC CIVIL EMERGENCY WARNING SYSTEM

Filed Sept. 6, 1961 4 Sheets-Sheet 1

FIG. I 7x 5006
x 5013
Rm

INVENTORS
James Willis Hughes
Nathan J. Stowell
BY Munson H. Lane
ATTORNEY

AUTOMATIC CIVIL EMERGENCY WARNING SYSTEM

Filed Sept. 6, 1961 4 Sheets-Sheet 2

INVENTORS
James Willis Hughes
Nathan J. Stowell

BY Munson H. Lane

ATTORNEY

April 21, 1964 J. W. HUGHES ETAL 3,130,396

AUTOMATIC CIVIL EMERGENCY WARNING SYSTEM

Filed Sept. 6, 1961 4 Sheets-Sheet 3

INVENTORS
James Willis Hughes
Nathan J. Stowell

BY [signature]

ATTORNEY

AUTOMATIC CIVIL EMERGENCY WARNING SYSTEM

Filed Sept. 6, 1961

4 Sheets-Sheet 4

INVENTORS
James Willis Hughes
Nathan J. Stowell
BY Munson H. Lane
ATTORNEY

United States Patent Office 3,130,396

Patented Apr. 21, 1964

3,130,396

AUTOMATIC CIVIL EMERGENCY WARNING SYSTEM

James Willis Hughes, P.O. Box 1713, and Nathan J. Stowell, both of Jackson, Miss.; said Stowell assignor to said Hughes Filed Sept. 6, 1961, Ser. No. 136,294
24 Claims. (Cl. 340—310)

The present invention relates generally to a civil emergency warning system, and more particularly to a warning system wherein alarm and voice signals may be generated at a central station and transmitted over a power distribution system, to be automatically received by receivers of local inhabitants and vehicle occupants within the area of power distribution.

It is an object of this invention to provide a warning system that will provide in case of local or national emergency a fast means of alerting and instructing the maximum number of inhabitants in an area.

It is an object of this invention to provide an automatic alarm and signaling system for transmitting voice and code signals through the available electric power transmission and distribution facilities to the audio section of conventional television and radio receivers where the signals are amplified and broadcast over the receiver loud speakers.

It is an object of the invention to provide an adapter for conventional television and radio receivers which will automatically switch on electric power to the television or radio receiver and condition the audio section of the receiver to pass alarm and warning signals picked up from an electric power distribution network, and to exclude signals from the radio frequency sections of the receiver.

It is an object of this invention to provide an alarm system in which a low frequency signal generator may be switched on automatically or manually in the event of an emergency to transmit low frequency signals over a power distribution network for automatically conditioning a conventional radio or television receiver that has been modified by an adapter to receive and broadcast warning signals through the audio section of the receiver.

It is an object of this invention to provide a vehicular proximity audio receiver which will receive warning signals transmitted over a power line distributor system.

Briefly, the warning system of this invention functions to permit alarm signals and voice communication originating at a central office to be transmitted by direct wire lines to electric utility substations, where the alarm signals and voice communications are amplified and coupled to the secondary side of the substation power lines. A low frequency signal generator at the substation, triggered for operation from the central office, produces a signal which is transmitted over the power lines for the purpose of turning on all radio and television receivers connected within the power distribution network and conditioning the audio section of the receivers to receive alarm signals and voice communication from the power lines. After the signal generator has been triggered by the central office a few seconds are allowed for the receivers connected to the power lines to be warmed up. Thereafter the alarm signals and voice communications from the central office may be transmitted over the power lines and received by the receivers in the proximity of the power distribution system. The audio section of the receiver amplifies the alarm signal and voice communication and broadcasts through the receiver loud speaker. The alarm signal is transmitted separately from the voice communication to alert the inhabitants within the area of the power distribution system to an emergency. After the alert the alarm signal may be cut out and announcements made by voice communication to instruct the inhabitants as to the nature of the emergency.

Other objects of the invention will be more apparent from the following detailed description read in conjunction with the accompanying drawings.

Figure 1:
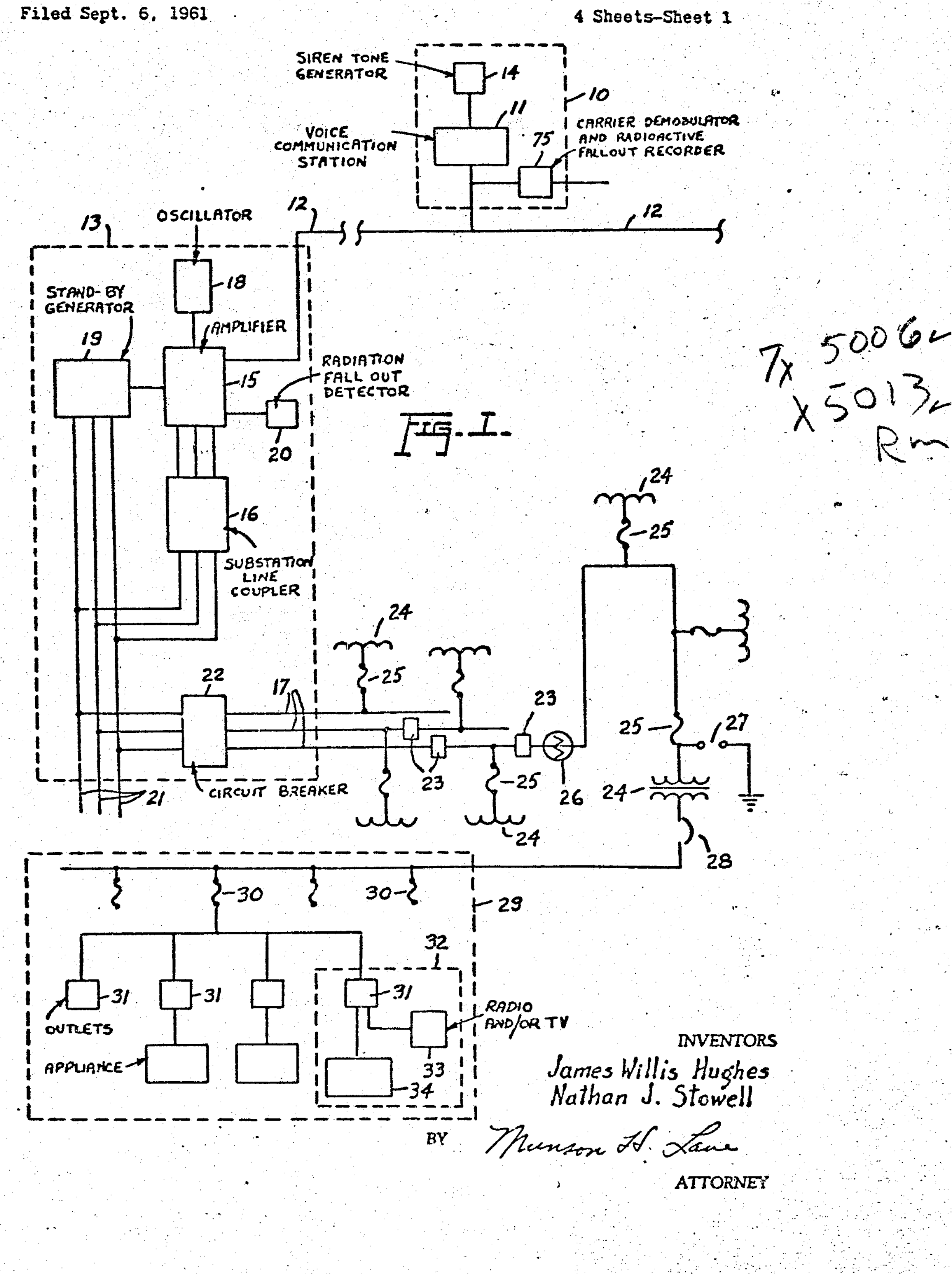
FIG. 1 is a diagram of the warning system of the invention showing the various components of the system in block form.

The drawings, and more particularly FIG. 1, show the major components of this invention. At a central office 10, such as a civil defence office where emergency warning signals and instructions originate, is located a voice communication station 11. The voice communication station, including a microphone, is adapted to receive oral announcements from an operator or recording and to convert the oral sound into electrical signals for transmission over a direct telephone cable 12 to substations 13 in an electric power distribution system. At the central office is also located a siren tone generator 14, for example a 15 AGS Dukane generator, which may be automatically or selectively operated to direct alarm signals through the voice communication station to the direct telephone cable 12 connecting the various substations. It is intended that the signal produced by the siren tone generator be used to attract the attention of persons within hearing distance of radio or television receivers located in homes, public buildings or automobiles within the electric power system distribution area. After the attention of inhabitants has been obtained the siren tone generator may be turned off and voice instructions given through the voice communication station.

Located at a typical substation 13 is a power amplifier 15 which amplifies the voice or alarm signals from the central office 10. A coupling network 16 couples the amplified voice and alarm signals to the secondary side of the substation power distribution line 17. The coupling network 16 comprises elements such as capacitors capable of blocking sixty cycle alternating current frequencies from the power amplifier, while offering low impedance to the audio voice and alarm frequencies as well as to signals from the signal generator 18.

The low frequency signal generator 18, located at substation 13, generates a signal for activating a relay, subsequently to be described, in radio and television receivers to turn on the receivers and condition the audio section thereof to receive, amplify and broadcast the alarm and voice signals transmitted over the power line 17. The signal generator 18 preferably produces a two hundred forty cycle per second signal synchronized with the fourth harmonic of the power line frequency, assuming a sixty cycle per second line frequency is used. Other frequency signals may be used depending on the power line frequency. It is preferred to use a frequency which is the fourth harmonic of the power line frequency for the reason that the energy loss within power distribution transformers is low for signals of such frequency.

The signal generator 18 is adapted to be energized by signals from the central office 10. The output of the signal generator 18 is fed through power amplifier 15 and is coupled through coupling network 16 to the power lines 17.

A stand-by, automatically controlled, gasoline powered, motor-generator set 19 is provided at the substation 13 for the purpose of supplying power to the amplifier 15, the signal generator 18, the siren tone generator 14, and a radioactive fallout detector 20 subsequently to be described. The motor-generator set 19 is adapted to be automatically started and operated upon failure of power in the main lines 21.

The radioactive fallout detector 20 is installed at the substation 13 for continuously transmitting to central control points precise radioactive fallout information. It may be adapted to trip an alarm at the central office 10 when the radiation count approaches the danger zone. The detector 20 is connected to a carrier amplifier for the purpose of transmitting modulated carrier signals over the telephone cable 12 to the central office 10, where the carrier signal is demodulated and the radioactive fallout level is recorded by suitable apparatus indicated by block 75.

The secondary side of the substation power distributor system is illustrated as a conventional three-phase, radial urban distribution system. The invention, however, is adapted for use with other conventional power distribution systems. The secondary side of the system includes usual elements, including, for example, a three-pole circuit breaker 22, automatic single pole circuit reclosers 23, single phase distribution transformers 24, fuse cutouts 25, feeder voltage regulators 26, lightning arrester 27, and low-voltage, thermally operated circuit breakers 28.

The electric wiring to a typical consumer's home 29 includes the circuit breaker 28, plural fused circuits 30, and receptacle outlets 31. A receptacle outlet 31 is provided in a bomb shelter area 32, to which the radio or television receiver 33 adapted by this invention to receive warning signals is connected. In case of failure of the electric power provided by the power utility, a battery powered radio or television receiver 34 may also be included in the shelter area. The battery powered receiver 34 is adapted to receive and broadcast audible warning signals and announcements from the central office 10 over the power lines 17 as long as the secondary side of the substation power distribution system remains undisrupted even though the power in the mains has failed because of disruption of the supply to the substation 13.

Figure 2:
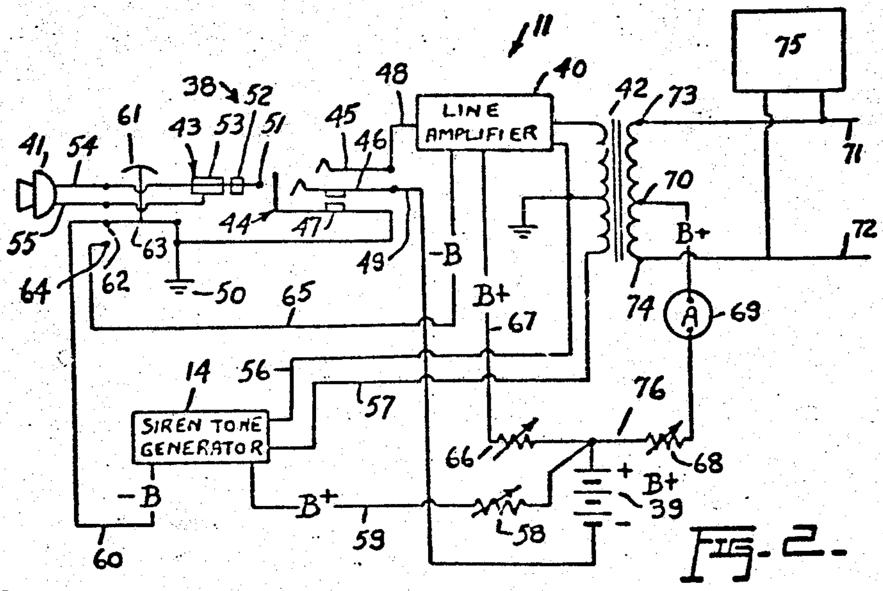
FIG. 2 is a schematic diagram of a typical installation at a central control office for sending alarm and voice signals over direct line telephone to a substation for transmittal over a power distribution network.

FIG. 2 illustrates a typical installation at the central office 10. It is to be understood that various arrangements for transmitting voice and alarm signals from the central station 10 to the substations 13 can be used within the scope of the present invention. The voice communication station 11 includes a power supply 39, a line speech amplifier 40, a microphone 41, and a coupling transformer 42. The microphone 41 is illustrated as being optionally connected to the input of line amplifier 40 through a conventional tip, ring and sleeve, plug and jack connection 38. The jack 44 includes three terminals 45, 46 and 47 connected to the amplifier input lead 48, the power supply negative lead 49, and to ground 50, respectively.

Terminal 46 within the jack 44 is a spring element which functions as a normally open switch contact adapted to be forced into engagement with ground terminal 47 upon insertion of plug 43 within the jack. The plug 43 includes a conductor tip 51, a conductor ring 52 and a conductor sleeve 53, each suitably insulated from each other. One lead 54 from the microphone 41 is connected with the conductor tip 51; a second lead 55 from the microphone is connected with the sleeve 53.

Upon insertion of the plug 43 within the jack 44 connection of lead 54 from the microphone 41 is made through the conductor tip 51 and terminal 45 to the line amplifier input terminal 48; connection of lead 55 from the microphone is made through sleeve 53 and terminal 47 to ground 50; and the negative power supply lead 49 is connected to ground through closed contact between terminals 46 and 47.

The output of siren tone generator 14 is connected to the coupling transformer 42 by leads 56 and 57. Power for the siren tone generator is connected from the positive side of power supply 39 through variable resistor 58 and positive lead 59. The negative lead 60 from the siren tone generator is normally connected to ground 50 through a normally closed connection between contact 62 and movable contact 63 of push-to-talk switch 61 which is located near the microphone 41. Contact 63 is connected to ground 50. The negative side of the power supply 39 is connected to ground as aforementioned through the closed terminals 46 and 47 of jack 44 when the plug 43 and jack 44 are connected.

The purpose of the push-to-talk switch 61 is to permit the siren tone generator to transmit alarm signals over the telephone cable 12 except when voice communication via microphone 41 is to be transmitted. Then the push-to-talk switch is depressed to shift movable element 63 from engagement with contact 62 to engage contact 64. Contact 64 of the push-to-talk switch is connected to the negative lead 65 of the line speech amplifier 40. The positive side of power supply 39 is connected to the line speech amplifier 40 through variable resistor 66 and positive lead 67. Depression of switch 61 de-energizes the siren tone generator by opening the connection of negative lead 60 to ground, and energizes the line speech amplifier 40 by closing the connection of negative lead 65 to ground.

The sleeve-ring-tip, plug and jack connection 38 serves as the switch means for energizing the siren tone generator 14. Insertion of plug 43 in jack 44 connects the power supply 39 to ground, thereby energizing the siren tone generator. It also functions to actuate a stand-by relay 80 (see FIG. 3) at the substation 13 by applying simplex voltage to the telephone cable 12, as will next be described.

In order to provide simplex voltage to operate a stand-by relay at substation 13 the positive side of power supply 39 is connected by a lead 76 to center tap 70 of the secondary side of coupling transformer 42. Variable resistor 68 and current meter 69 are inserted in series with the lead 76 for purposes of adjusting the current for energizing stand-by relay 80 at the substation 13. Since the negative side of the power supply 39 is connected to ground, by inserting plug 43 in jack 44, a coil of the stand-by relay 80 at the substation having one side connected to power supply 39 through the telephone cable 12 and the other side connected to ground is energized when the plug and jack connection 38 is made. The function of the stand-by relay will subsequently be described.

Figure 3:
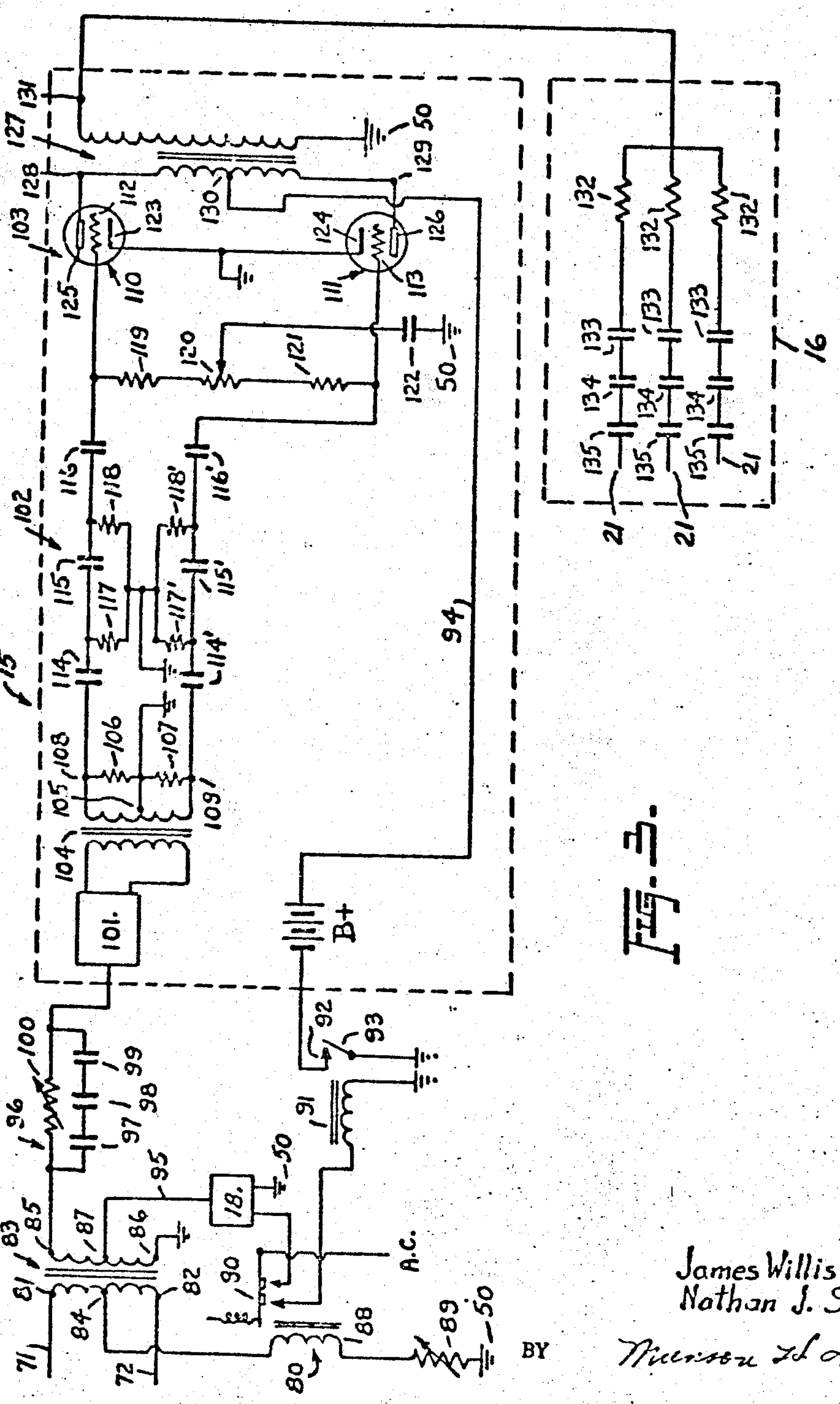
FIG. 3 is a schematic diagram of a typical installation at a substation for receiving signals by direct line from a central office and transmitting over a power distribution network.

The telephone cable 12 is illustrated as including at least a pair of conductors 71 and 72 connected to the secondary terminals 73 and 74 of coupling transformer 42 at one end and to the primary terminals 81 and 82 of a coupling transformer 83 located at substation 13 (see FIG. 3). Other conductors may be included for auxiliary purposes.

A carrier demodulator and radioactive fallout level recorder is indicated in block form by reference numeral 75. The demodulator is connected to the conductors 71 and 72 by suitable filter networks designed to permit the modulated carrier frequency to pass, but blocking other undesired frequencies. Modulated carrier signals from the radioactive fallout detector and carrier amplifier are transmitted by the conductors 71 and 72 to the central station 10 where the carrier signal is demodulated and the radioactive fallout level recorded. An operator at the central station 10 observing the records can immediately send emergency warnings upon observing an excessive radioactive fallout level.

In FIG. 3 conductors 71 and 72 of the telephone cable 12 are shown connected to the primary terminals 81 and 82 respectively of coupling transformer 83 located at the substation 13. The secondary terminals 85 and 86 of transformer 83 are connected respectively to a preemphasis network 96 and to ground. A relay coil 88 of stand-by relay 80 is connected on one side to the center tap 84 of coupling transformer 83, and is connected on the other side to ground through variable resistor 89.

Energizing of the stand-by relay coil 88 closes the normally open plural contact switch 90 to apply alternating current to the signal generator 18, and to an alternating current relay 91. Energizing of relay 91 closes the B+ power supply circuit 94 to the power amplifier 15 through switch contacts 92 and 93. The signal generator 18, illustrated as a 240 c.p.s. oscillator, when energized by the actuation of the stand-by relay 80, begins to oscillate and sends out the 240 c.p.s. signal to the power amplifier 15. The power amplifier, also energized by actuation of stand-by relay, amplifies and transmits the output of the signal generator, as well as any signals from the central office 10.

The output lead 95 of the signal generator 18 is connected to center tap 87 on the secondary side of coupling transformer 83.

The preemphasis network 96 comprises series capacitors 97, 98, 99 connected in parallel with a variable resistor 100. The output of the preemphasis network is connected to the input terminal of the power amplifier 15. Preemphasis network 96 is provided for the purpose of compensating for frequency variations due to changing parameters in the line.

The power amplifier 15 comprises one or more preamplifier stages indicated by block 101, a harmonic suppressor network 102 and a push-pull driver stage 103. The pre-amplifier stages 101 are coupled to the harmonic suppressor network 102 by a coupling transformer 104. A center tap 105 on the secondary side of the transformer 104 is connected to ground and to one side of resistors 106 and 107. The other side of resistor 106 is connected to terminal 108 of transformer 104. The other side of resistor 107 is connected to terminal 109 of transformer 104.

The harmonic suppressor network 102 is described in the copending application Serial No. 122,532, filed July 7, 1961, in the name of Nathan J. Stowell as inventor and assigned to James Willis Hughes. It includes a pair of 180° phase shift networks connecting the grids of the driver tubes 110 and 111 with the output terminals 108 and 109 of the transformer 104. The network connecting terminal 108 with grid 112 of tube 110 includes equal capacitors 114, 115 and 116 connected in series, and shunt resistors 117 and 118 connected from the junctions of capacitors 14 and 115, and capacitors 115 and 116 respectively to ground. The phase shift network connecting terminal 109 to grid 113 of driver tube 111 is similar to the phase shift network connecting terminal 108 to grid 112 of tube 110, and elements of one correspond to the elements of the other but reference numerals of one are indicated with primes. A grid bias network connected between the grids of driver tubes 110 and 111 includes resistors 119, 120 and 121 connected in series. A variable tap or resistor 120 is connected to the grid bias source 122. The cathodes 123 and 124 of tubes 110 and 111, respectively, are connected together and to ground. Plates 125 and 126 of tubes 110 and 111 respectively are connected to opposite terminals 128 and 129 of the primary winding of output transformer 127. Positive B+ voltage to the plates of the driver tubes is connected to center tap 130 of the primary winding of transformer 127. The secondary winding of transformer 127 is connected between ground 50 and the coupling network 16.

The coupling network 16 includes three similar parallel branches connected between terminals 131 of the transformer 127 and respective wires of the substation secondary mains 21. Each branch includes a resistor 132 and capacitors 133, 134 and 135 connected in series.

Figure 4:
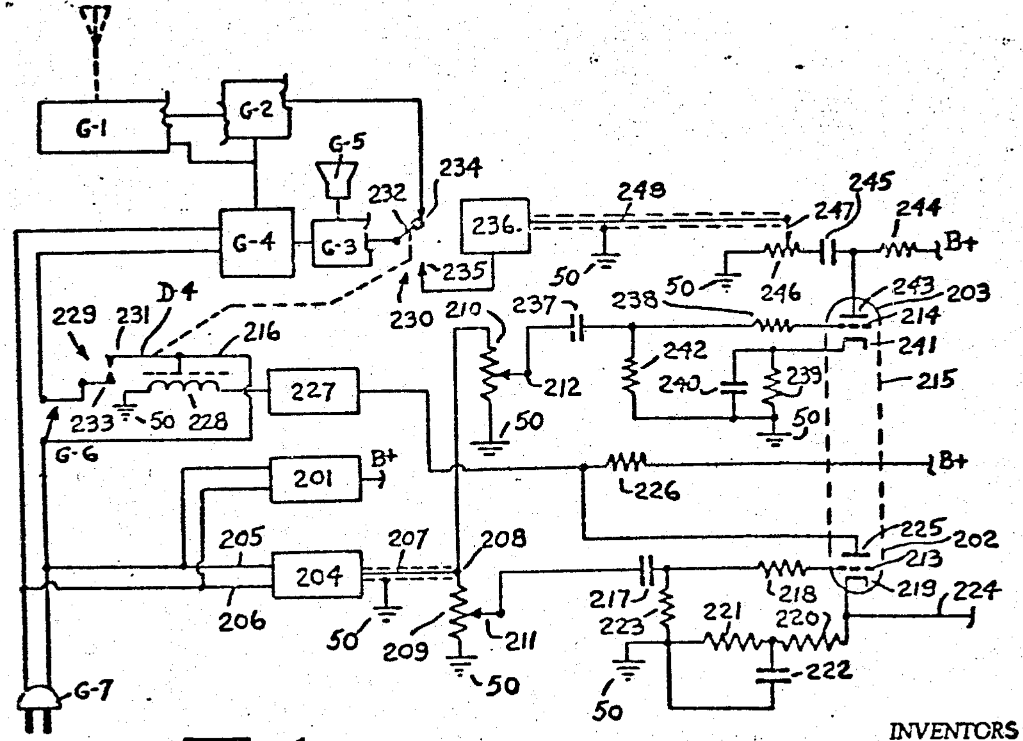
FIG. 4 is a schematic diagram showing a conventional radio or television receiver in block form with the components of this invention adapting the receiver for automatic reception of warning signals set forth in detail.

FIG. 4 illustrates a radio or television receiver system whereby the receiver may be manufactured or converted by the use of an inexpensive adapter to a civil defense automatic signaling and alarm device. In FIG. 4 all components indicated by reference numerals preceded by the letter "G" are conventional components or sections of television, AM or FM radio or Hi-Fi receiver sets. Other components indicated by reference numerals not preceded by a letter are added to a conventional receiver either by a manufacturer in the original manufacture of the set or by subsequent addition to a manufactured set.

G-1 indicates a receiver set; G-2 is the intermediate frequency section of the receiver; G-3 is the audio section of the receiver; G-4 is the power supply existing in a receiver set; G-5 is the speaker in the receiver; G-6 is the manual off and on switch in the receiver; G-7 is the 115 volt A.C. plug connecting the receiver to a power outlet 32.

Supplementing the conventional parts in a receiver in accordance with the invention are components adapting the receiver to be automatically turned on in response to a 240 c.p.s. signal transmitted over the power lines and adapting the receiver audio section of the receiver to amplify and broadcast audio warning signals and voice communication also transmitted over the power lines.

Designated at 201 is a power supply which is connected across the power lead to the existing receiver ahead of the off and on switch G-6 to supply filament and B+ voltages to the amplifiers 202 and 203 subsequently to be described.

Designated at 204 is a 240 cycle high pass filter designed to pass the 240 cycle signal frequency generated by signal generator 18, and higher frequencies in the audio range, but excluding the 60 cycle power line frequency. The input leads 205 and 206 of filter 204 are connected across the power lead of the existing receiver ahead of the off and on switch G-6. The output lead 207 of filter 204 is connected to one side 208 of a pair of parallel variable resistors 209 and 210. The other sides of the resistors 209 and 210 are connected to ground 50.

Signal voltages passing the filter 204 and appearing across the resistors 209 and 210 are picked off the resistors by variable contacts 211 and 212. These voltages are fed to the grids 213 and 214 of amplifiers sections 202 and 203, respectively, of a dual triode vacuum tube 215 (12AT7 or other) having sufficient gain to operate the alarm device from any place within the range of a single substation and to its termination at its outermost point. This tube must also have sufficient power to operate the priority relay 216.

Amplifier section 202 is provided to amplify the 240 c.p.s. signal from the signal generator 18 and to pass the amplified signal to the priority relay 216. Grid coupling capacitor 217 and grid limiting resistor 218 are connected in series between variable tap 211 and grid 213. The cathode 219 of amplifier section 202 is connected to ground through series resistors 220 and 221. Designated at 222 is a by-pass capacitor connected in parallel with cathode bias resistor 221. Grid bias resistor 223 is connected from the junction of capacitor 217 and resistor 218 to ground. A cathode follower auxiliary output terminal 224 is provided to supply a 240 cycle alarm device (not shown). Plate 225 of amplifier section 202 is connected to B+ potential from power supply 201 through plate resistor 226.

Amplified signal voltage from the plate 225 is connected through a 240 c.p.s. band pass filter 227 to the priority relay 216.

Priority relay 216 includes a relay coil 228 and two switch sections 229 and 230. Relay coil 228 is connected in series between the 240 c.p.s. band pass filter 227 and ground. Switch sections 229 and 230 include movable contacts 231 and 232, respectively, which are mechanically connected for actuation by the relay coil 228.

Switch section 229 is normally open when the relay 216 is deenergized. It is connected in shunt around the manual on and off switch G–6. Fixed contact 233 of switch section 229 is connected to the receiver side of the manual on and off switch, and movable contact 231 is connected to the plug side of the manual on and off switch.

Switch section 230 includes in addition to movable contact 232 a pair of fixed contacts 234 and 235. Movable contact 232 normally engages fixed contact 234, but is moved to engage fixed contact 235 when relay 216 is energized. Fixed contact 234 is connected to the receiver detector section G–2. Fixed contact 235 is connected through a high pass audio filter 236 to the output of amplifier section 203. The movable contact 232 is connected to the audio section G–3 of the receiver. It is apparent that when the relay 216 is deenergized the movable contact 232 connects the detector section G–2 to the audio section G–3. When the relay 216 is energized the movable contact 232 connects the output of amplifier 203 to the audio section G–3.

Amplifier section 203 is provided to amplify the audio alarm signals and the voice signal picked up from the power lines and passed through filter 204. Grid coupling capacitor 237 and grid limiting resistor 238 are connected in series between the variable resistor tap 212 and the grid 214 of amplifier section 203. Cathode bias resistor 239 and by-pass capacitor 240 connect the cathode 241 of amplifier section 203 to ground. A grid bias resistor 242 connects the junction of capacitor 237 and resistor 238 to ground. Plate 243 is connected to B+ potential through plate resistor 244.

Output signal voltage is taken from the plate of amplifier section 203, through decoupling capacitor 245 and potentiometer 246 serially connected to ground. The variable potentiometer tap 247 connects through the high pass filter 236 with contact 235 in the audio circuit conditioning switch 230. The level gain control potentiometer 246 provides audio output gain control which will regulate the amount of output from speaker G–5 irrespective of the volume control setting in the existing set. A grounded shield 248 is provided surrounding the conductor connecting potentiometer 246 with high pass filter 236.

The high pass audio filter 236 is designed to pass signals above 300 cycles per second and to block the 240 c.p.s. signal required for energizing relay 216.

Consider now the function of the apparatus illustrated in FIG. 4 when the receiver plug G–7 is connected in an electric outlet 31 of the system illustrated in FIG. 1.

Receiver G–1 and its component parts indicated by reference numerals preceded by the letter "G," is adapted to function as an ordinary radio or television receiver, whichever the receiver may be, as long as no emergency warning signals are being transmitted over the power lines 17. The set is adapted to be turned on and off in the usual manner by means of an on and off switch G–6.

Assuming that there is an emergency and that the operator at central office 10 sends out an emergency alarm by inserting plug 43 in jack 44, such action will activate the siren tone generator 14 and simultaneously transmit a simplex voltage over the telephone cable 12 to the substations 13. The simplex voltage will actuate the standby relay 80, thereby energizing the 240 c.p.s. signal generator 18 and applying voltage to actuate the alternating current relay 91, which in turn applies B positive voltage to the power amplifier 15. Once the 240 c.p.s. signal generator 18 has warmed up it generates a continuing 240 c.p.s. signal which is amplified by the power amplifier 15 and coupled to the substation secondary power distribution lines 17. The 240 c.p.s. signal is picked up at the outlet receptacle 31 through the receiver plug G–7 in a consumer's home, public building or shelter area, and passed through the 240 c.p.s. high pass filter. It is amplified by the amplifier 202 and passed through the 240 c.p.s. band pass filter 227. This filter excludes frequencies other than the 240 c.p.s. signal, while passing the 240 c.p.s. signal to activate the priority relay 216. Activation of the priority relay closes switch 229 and by-passes the receiver manual on and off switch G–6. By-passing the manual on and off switch G–6 turns the receiver on in the event that the set is not already turned on, by the manual on and off switch. Activation of the priority relay 216 also disconnects the receiver audio section G–3 from the receiver detector section G–2 and connects the receiver audio section to the audio alarm amplifier 203. The receiver is thereby conditioned on receiving a 240 c.p.s. signal to receive audio alarm and voice signals irrespective of whether the receiver set happens to be on at the time or not.

As heretofore mentioned, the siren tone generator 14 is activated when plug 43 is inserted in jack 44. The siren tone generated is transmitted over the telephone cable 12 simultaneously with the simplex voltage. Once the power amplifier has been energized as explained heretofore, the siren tone is amplified and transmitted over the substation power distribution lines 17 simultaneously with the 240 c.p.s. signal. The siren tone is picked up at an outlet 31 through the receiver plug G–7 and passed through the 240 c.p.s. high pass filter 204 along with the 240 c.p.s. signal. The siren tone is then amplified by alarm amplifier 203 and coupled from the plate thereof through the audio volume control potentiometer 246 and the 300 c.p.s. high pass filter 236. The 300 c.p.s. high pass filter excludes frequencies below 300 c.p.s. but passes the audio siren tone signal through relay switch 232 to the audio section G–3 of the receiver, where it is amplified and broadcast over the receiver loud speaker G–5.

After alerting the listening public by means of the siren tone signal the operator at the central office 10 may then transmit oral instructions over the power lines by depressing the push-to-talk switch 61 and talking over the microphone 41. The siren tone generator 14 is thereby disconnected from the line speech amplifier 40 and the microphone is connected instead. The voice communication is transmitted over the power lines and is received by the receiver in the same way as was the siren tone signal. The signal received through G–5 will not have any of the control signals such as the 240 c.p.s. signal. Neither will it reproduce a 60 cycle hum normally on a 60 cycle line. These unwanted signals have been eliminated by the use of filter networks 204 and 246 and through carefully chosen values used on capacitors 237 and 245.

The level control for audio gain in amplifier 203 is pre-set by means of variable resistor 212. The control is necessary to eliminate the possibility of over-drive or insufficient audio gain for intelligibility.

Figure 5:
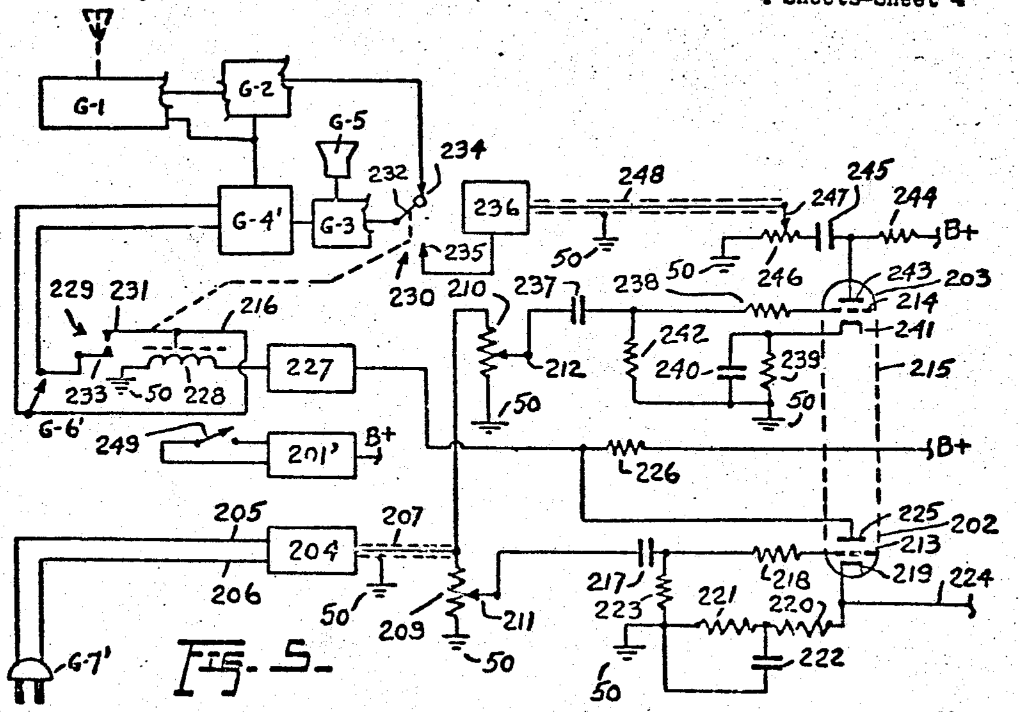
FIG. 5 is a schematic diagram similar to FIG. 4 but showing the invention applied to a battery operated radio or television receiver.

FIG. 5 shows a battery operated radio or television receiver adapted within the scope of this invention to receive and broadcast alarm and voice signals transmitted over power lines. The receiver is similar to the receiver illustrated in FIG. 4 except for the modified power supply. Components in FIG. 5 corresponding to components in FIG. 4 are designated by the same reference numerals and the function of such components may be understood by reading the specification concerning FIG. 4.

The power supply G–4' of the battery operated receiver in FIG. 5 differs from the power supply G–4 of the receiver shown in FIG. 4 in that it includes the battery power packs of conventional battery operated radio or television receivers, whereas the power supply in FIG. 4 is fed by alternating current from the power lines. A manual on-off switch G-6' instead of being located in the alternating current power leads as shown in FIG. 4, is included in the battery power circuit of G-4'. The priority relay 216 includes switch section 229 connected to shunt the manual on-off switch G-6' upon the energizing of the relay, thereby energizing the receiver.

Signals from the power lines 17 are taken via an alternating current plug G-7' connected into an outlet receptacle 31 and fed by leads 206 and 205 to the 240 cycle high pass filter 204.

Since the battery operated receiver is intended for use in the event of public utility power failure a battery power supply 201' is used to supply filament and B+ voltages to the amplifier sections 202 and 203. Manual switch 249 is shown in the circuit of battery power supply 201' for energizing the same when public utility power failure is observed. Switch 249 could just as well be operated by a relay connected to the power line for closing the switch 249 automatically when public power is disrupted.

In all other respects except those set forth above the apparatus illustrated in FIG. 5 is similar in structure and in function to the apparatus in FIG. 4.

Figure 6:
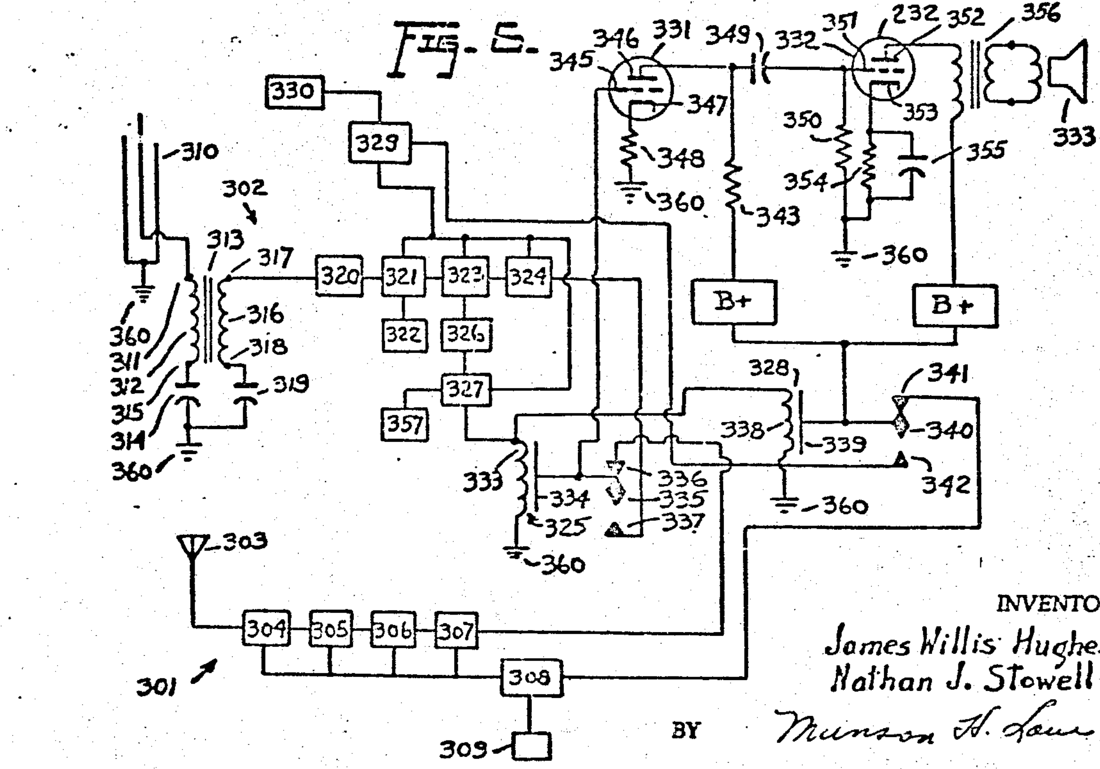
FIG. 6 is a block diagram of a conventional vehicle radio receiver with components adapting the receiver for proximity reception of signals from power lines set forth in schematic detail.

In FIG. 6 is illustrated a vehicular proximity audio receiver for the purpose of enabling an occupant of a vehicle equipped with such receiver to receive alarm and voice warning signals which are transmitted over power distribution networks in accordance with the present invention.

The vehicular proximity audio receiver can be adapted to an existing automobile receiver or can be manufactured as an integral part of new receivers.

The vehicular proximity audio receiver becomes operable as soon as the ignition switch of the vehicle is turned on.

There are two specific sections of the vehicular proximity audio receiver, namely (1) a radio frequency (RF) receiver section designated generally by the reference numeral 301, and (2) a proximity audio frequency (AF) receiver section designated generally by the reference numeral 302.

The RF receiver section 301 is of conventional automobile radio receiver design. It is illustrated in FIG. 6 as a superhetrodyne type radio receiver, with component stages illustrated in block form. It includes an RF antenna 303, an RF amplifier 304, an oscillator 305, intermediate amplifier stages 306, a detector 307, a power supply 308, and a manual off-on switch 309. The radio receiver power supply 308 supplies A and B voltage to the RF receiver when the manual off-on switch 309 is operating in the "on" position.

The proximity audio frequency receiver section 302, hereafter referred to as the proximity receiver section, is designed to receive audio frequency signals which are radiated from power lines carrying the alarm and voice signals generated at the central station 10 (see FIG. 1) and the 240 cycle signal generator signal generated at the substation 13. It includes an omni-directional antenna 310 connected to terminal 311 of the primary side 312 of matching transformer 313. Capacitor 314 is connected between terminal 315 of the primary side and ground 350 for tuning the primary side of the antenna. The secondary side 316 of matching transformer 313 includes terminal 317 connected to a 240 cycle high pass filter and opposite terminal 318 connected through tuning capacitor 319 to ground 360.

The 240 cycle high pass filter 320 is designed to pass signals of 240 cycles per second and higher, and to block lower frequency signals.

The output of the high pass filter 320 is connected to the input of a high gain input amplifier 321. Connected to the high gain input amplifier is a master gain control 322 for the vehicular proximity receiver section 302.

The output of the high gain amplifier 321 is fed to a second stage voltage amplifier 323.

The output of the voltage amplifier 323 is fed to a third stage amplifier 324 where signals above 300 cycles per second are amplified and passed on to a contact 337 on relay 325. A suitable filtering network is included within the block designated 324 to pass only signals above 300 cycles per second and to reject all signals below 300 cycles per second.

A second output from voltage amplifier 323 is fed to a 240 c.p.s. band pass filter 326. The filter 326 is designed to pass only the 240 c.p.s. signal from signal generator 18 for the purpose of operating relay 325.

A relay amplifier 327 amplifies the 240 c.p.s. signal output from filter 326 to operate relay 325 and a second relay 328.

The block designated 357 is a gain control for relay amplifier 327.

A power supply 329 which is adapted to receive energy from a vehicle battery when the vehicle ignition switch 330 is turned on supplies the proximity receiver section 302 and the audio amplifier stage 331 and 332 when relays 325 and 328 are energized.

Relay 325 includes a relay coil 333 connected between the output terminal of relay amplifier 327 and ground, and an armature 334 operatively connected with movable switch contact 335. Switch contact 335 is connected to the input grid 345 of amplifier 331 and is movable between fixed contacts 336 and 337. Contact 336 is normally engaged by the movable contact 335 and is connected to the output of the radio frequency receiver detector 307. Contact 337 is normally open and is connected to the output of the audio frequency output amplitude 324.

Relay 328 includes a relay coil 338 connected between the output of relay amplifier 327 and ground, and an armature 339 operatively connected with movable switch contact 340. Switch contact 340 is connected to amplifiers 331 and 332 through a plate resistor 343 and a coupling transformer coil 344, respectively. Switch contact 340 is movable between fixed contacts 341 and 342. Contact 341 is normally engaged by movable contact 340 and is connected to the RF receiver section power supply 308. Contact 342 is normally open and is connected to the proximity receiver section power supply 329.

Amplifier 331 is a voltage amplifier and is illustrated to be a vacuum tube triode having a grid 345, a plate 346 and a cathode 347. Cathode 347 is connected to ground through cathode resistor 348. The output voltage from the plate 346 of amplifier 331 is coupled to the grid of amplifier 332 through coupling capacitor 349 and across grid resistor 350.

Amplifier 332 is a power amplifier and is illustrated to be a vacuum tube triode having a grid 351, a plate 352, and a cathode 353. The cathode 353 is connected to ground through cathode resistor 354 and cathode by-pass capacitor 355. The output of amplifier 332 is coupled to loud speaker 333 through transformer 356, having a winding 344 connected in series with plate 352 and the B+ potential power source.

The apparatus as illustrated in FIG. 6 is normally conditioned to function as a conventional vehicular radio receiving radio frequency broadcasts through the radio frequency section 301, and passing the detected audio modulation from detector 307 to the audio amplifier 331 through normally closed contact 336 of the relay 325. Audio amplifiers 331 and 332 amplify the signal for broadcasting through the loud speaker 333. The radio frequency section 301 and amplifiers 331 and 332 normally receive power from the radio receiver power supply 308.

However, in the event of an emergency when warning signals are transmitted over the power lines 17 (see FIG. 1) the apparatus as illustrated in FIG. 6 is automatically conditioned to receive audio frequency signals upon receiving a 240 cycle per second signal in the audio frequency receiver section 302 and actuation of relays 325 and 328 in response thereto.

The 240 c.p.s. signal which is continuously transmitted by signal generator 18 at the substation 13 as long as alarm and voice signals are being sent out from the central station 10, is picked up by the omni-directional antenna 310 and coupled to the high gain input amplifier 321 through matching transformer 313 and the 240 c.p.s. high pass filter 320.

The high gain amplifier 321, which is sensitive to very low values of magneto-motive force and electro-motive force covering a band width from 240 4,000 cycles per second, amplifies the 240 c.p.s. signal and couples it to second stage voltage amplifier 323. The second stage voltage amplifier again amplifies the 240 c.p.s. signal and couples it through the 240 c.p.s. band pass filter 326 to the relay amplifier 327. The amplified signal from the relay amplifier 327 actuates relays 325 and 328, thereby moving contact 335 of relay 325 into engagement with contact 337, and moving contact 340 of relay 328 into engagement with contact 342 in order to connect the output of the third stage amplifier 324 with the input of audio amplifier 331 and to connect the audio frequency receiver power supply 329 with the amplifiers 331 and 332.

The audio frequency receiver section 302 is thereby conditioned upon receipt of a 240 cycle per second signal to receive audio alarm and voice signals and to send them after amplification through amplifiers 331 and 332 to loud speaker 333, which audibly broadcasts the alarm and voice communications to the occupant of the vehicle incorporating the receiver.

Since the alarm and voice signals are normally transmitted simultaneously with the 240 c.p.s. receiver conditioning signal, the amplifier stage 324 including a 300 c.p.s. high pass filtering network is included to separate the 240 c.p.s. signal from the higher audio alarm and voice signal frequencies. The 240 c.p.s. band pass filter 326 excludes signals other than the 240 c.p.s. signal from the relay amplifier 327.

It is apparent that the RF receiver section 301 may be turned on and off at will by operating the manual on and off switch 309 without affecting the operation of the proximity receiving section 302. However, should the RF receiver section be receiving a radio program the priority relays 325 and 328 will automatically cut off the RF signal to receive the audio alarm and voice signals when the vehicle is within proximity receiving range from a power line carrying the alarm and voice warning signals.

It is within the scope of this invention that the audio frequency proximity receiver section 302 may be used separately without the radio frequency receiver section. The apparatus would thereby be manufactured in accordance with FIG. 6 but excluding contacts 336 and 341 of relays 325 and 328, respectively, and the circuits connected to those contacts.

While in the foregoing there have been described and shown the preferred embodiments of the invention, various modifications may become apparent to those skilled in the art to which the invention relates. Accordingly, it is not desired to limit the invention to this disclosure and various modifications may be resorted to falling within the spirit and scope of the invention as claimed.

What is claimed is:

1. A civil emergency warning system comprising in combination with a substation secondary power distribution network having power transmission lines for carrying low frequency current, a voice communication station for producing voice signals, a siren tone generator for producing an audio alarm signal, a signal generator for producing a receiver automatic conditioning signal of lower frequency than said voice signals and audio alarm signals but higher than said low frequency current, amplifying means and coupling means connecting the signal generator output to said power transmission lines, a radio frequency receiver connected to said power transmission lines through a plug and an electric outlet receptacle, said radio receiver including a radio frequency receiving section having a detector in its final stage, an audio section normally connected to said detector, a radio receiver power supply and a manual on and off switch for energizing said radio receiver, conversion means for said radio receiver adapting said receiver to receive and broadcast audio alarm and voice signals from said siren tone generator and voice communication station, including an audio alarm and voice signal amplifier, and automatic switching means responsive to said receiver automatic conditioning signal for disconnecting said detector from said audio section and for connecting said audio alarm and voice amplifier to said audio section of said receiver and for automatically by-passing said manual on and off switch to energize said receiver irrespective of the position of said manual on and off switch, and means for selectively connecting said voice communication station and said siren tone generator alternately to said power transmission lines through said amplifying and coupling means.

2. The system as set forth in claim 1 wherein said radio frequency receiver is a conventional radio receiver.

3. The system as set forth in claim 1 wherein said radio frequency receiver is a conventional television set.

4. The system as set forth in claim 1 wherein said radio receiver power supply is energized by alternating current from said power transmission lines.

5. The system as set forth in claim 1 wherein said radio receiver power supply is energized by a battery.

6. The system as set forth in claim 1 wherein said audio alarm and voice signal amplifier and said automatic switching means are connected to said power transmission lines through said plug and a high pass filter capable of passing said receiver automatic conditioning signal and audio alarm and voice signals but blocking said low frequency current.

7. The system as set forth in claim 6 wherein said automatic switching means includes an amplifier, a receiver automatic conditioning signal band pass filter for rejecting signals other than the receiver automatic conditioning signal, and a relay, all operatively connected in series between said high pass filter and ground.

8. The system as set forth in claim 7 wherein said relay includes a coil and an armature which is operatively connected to movable contacts of two switch sections, one section being normally open when the relay is deenergized, including a movable contact and a fixed contact connected in shunt around said manual on and off switch; the other section including first and second fixed contacts and a movable contact, said first fixed contact being connected to said detector and said second contact being connected to said audio alarm and voice amplifier, and said movable contact being connected to said receiver audio section and normally engaging said first fixed contact when said relay is deenergized.

9. The system of claim 1 wherein the connector of said audio alarm and voice amplifier to said audio section of said receiver through said automatic switching means includes a high pass filter capable of passing audio alarm and voice signals but rejecting the receiver automatic conditioning signal and signals of lower frequency.

10. In combination with a radio frequency receiver including a radio frequency receiving section having a detector in its final stage, an audio section normally connected to said detector, a radio receiver power supply, and a manual on and off switch for energizing said radio receiver, conversion means for said radio receiver adapting said receiver to receive and broadcast audio alarm and voice signals which are transmitted over existing electric power distribution networks, said conversion means including an audio alarm and voice signal amplifier, and automatic switching means responsive to an automatic receiver conditioning signal transmitted over said electric power distribution network for disconnecting said detector from said audio section and connecting said audio alarm and voice amplifier to said audio section of said receiver and for automatically by-passing said manual on and off switch of said receiver to energize said receiver irrespective of the position of said manual on and off switch.

11. The apparatus of claim 10 wherein said radio frequency receiver is a conventional radio receiver.

12. The apparatus of claim 10 wherein said radio frequency receiver is a conventional television receiver.

13. The apparatus of claim 10 having conducting means including said manual on and off switch to connect said receiver power supply to said existing electric power distribution network when said manual on and off switch is on to energize said receiver power supply.

14. The apparatus of claim 10 including a battery having connections with said receiver power supply including said manual on and off switch to energize said receiver when said manual on and off switch is in the on position.

15. The apparatus of claim 10 wherein said audio alarm and voice signal amplifier and said automatic switching means have common conducting means including a high pass filter capable of passing said receiver automatic conditioning signal and said audio alarm and voice signals but blocking low frequency power currents, for connecting said audio alarm and voice signal amplifier and said automatic switching means to said existing electric power distribution network.

16. The apparatus of claim 15 wherein said automatic switching means includes an amplifier, a receiver automatic conditioning signal band pass filter for rejecting signals other than the receiver automatic conditioning signal, and a relay, all operatively connected in series between said high pass filter and ground.

17. The apparatus of claim 16 wherein said relay includes a coil and an armature which is operatively connected to movable contacts of two switch sections, one section being normally open when the relay is deenergized, including a movable contact and a fixed contact connected in shunt around said manual on and off switch; the other section including first and second fixed contacts and a movable contact, said first fixed contact being connected to said detector and said second contact being connected to said audio alarm and voice amplifier, and said movable contact being connected to said receiver audio section and normally engaging said first fixed contact when said relay is deenergized.

18. The apparatus of claim 10 wherein the connector of said audio alarm and voice amplifier to said audio section of said receiver through said automatic switching means includes a high pass filter capable of passing audio alarm and voice signals but rejecting the receiver automatic conditioning signal and signals of lower frequency.

19. A civil emergency warning system comprising in combination with a substation secondary power distribution network having power transmission lines for carrying low frequency current, a voice communication station for producing voice signals, a siren tone generator for producing an audio alarm signal, a signal generator for producing a receiver automatic conditioning signal of lower frequency than said voice signals and audio alarm signals but higher than said low frequency current, amplifying means and coupling means connecting the signal generator output to said power transmission lines, a vehicular proximity radio receiver including a radio frequency receiver section, a proximity audio frequency receiver section, a radio frequency receiver section power supply, a proximity audio frequency receiver section power supply, a common amplifier section, a loud speaker, said common amplifier section being normally connected to said radio frequency receiver section and to said radio frequency receiver power supply, automatic switching means responsive to receiver automatic conditioning signals received by said proximity audio frequency section to disconnect said common amplifier section from said radio frequency receiver section and said radio frequency receiver power supply and to connect said common amplifier to said proximity audio frequency receiver section and said proximity audio frequency receiver section power supply, means connecting said loud speaker to said common amplifier section output, and means for selectively connecting said voice communication station and said siren tone generator alternatively to said power lines through said amplifying means and coupling means.

20. A vehicular proximity radio receiver for receiving audio alarm signals, voice signals, and receiver automatic conditioning signals which are transmitted over an existing electric power distribution network, said vehicular proximity radio receiver including a radio frequency receiver section, a proximity audio frequency receiver section, a radio frequency receiver section power supply, a proximity audio frequency receiver section power supply, a common amplifier section having an input, an output and power terminals, a loud speaker connected to said common amplifier section output, said common amplifier section input and power terminals being normally connected to said radio frequency receiver section and said radio frequency receiver section power supply respectively, automatic switching means responsive to receiver automatic conditioning signals received by said proximity audio frequency receiver section to disconnect said common amplifier input and power terminals from said radio frequency receiver section and said radio frequency receiver section power supply respectively, and to connect said common amplifier input and power terminals to said proximity audio frequency receiver and to said proximity audio frequency receiver power supply respectively, whereby audio alarm and voice signals transmitted over an existing electric power distribution network may be automatically received by said proximity audio receiver section and amplified and broadcast through said common amplifier and loud speaker irregardless of the operative condition of said radio frequency receiver section.

21. A civil emergency warning system comprising in combination with an electric power distribution network having power transmission lines for carrying low frequency current, means for producing audio warning signals, a signal generator for producing a receiver automatic conditioning signal of lower frequency than said audio warning signals but higher than said low frequency current, amplifying means and coupling means serially connecting the signal generator output and said audio warning signals to said power transmission lines, a radio frequency receiver, receiver coupling means for coupling said radio receiver to said power transmission lines, said radio frequency receiver including a radio frequency receiving section having a detector in its final stage, an audio section normally connected to said detector, a radio receiver power supply and a manual on and off switch for energizing said radio receiver, conversion means for said radio frequency receiver adapting said receiver to receive and broadcast said audio warning signals, including an audio warning signal amplifier, and automatic switching means responsive to said receiver automatic conditioning signal for disconnecting said detector from said audio section and for connecting said audio warning signal amplifier to said audio section of said receiver and for automatically by-passing said manual on and off switch to energize said receiver irrespective of the position of said manual on and off switch, said receiver coupling means being connected to a filter network for passing said audio warning signals and said receiver automatic conditioning signal but excluding said low frequency current, said filter network having output connections to said automatic switching means and to said audio warning signal amplifier.

22. In combination with a radio frequency receiver including a radio frequency receiving section having a detector in its final stage, an audio section normally connected to said detector, a radio receiver power supply, and a manual on and off switch for energizing said radio receiver, conversion means for said radio receiver adapting said receiver to receive and broadcast audio warning signals which are transmitted over existing electric power distribution networks, said conversion means including an audio warning signal amplifier, automatic switching means responsive to an automatic receiver conditioning signal transmitted over said electric power distribution network for disconnecting said detector from said audio section and connecting said audio warning signal amplifier to said audio section of said receiver and for automatically by-passing said manual on and off switch of said receiver to energize said receiver irrespective of the position of said manual on and off switch, and receiver coupling means for coupling said receiver to said power distribution network, said receiver coupling means being connected to a filter network for passing said audio warning signals and said receiver automatic conditioning signal but excluding the low frequency power current normally carried by said power distribution network, said filter network having output connections to said automatic switching means and to said audio warning signal amplifier.

23. A civil emergency warning system comprising in combination with an electric power distribution network having power transmission lines for carrying low frequency current, means for producing audio warning signals, a signal generator for producing a receiver automatic conditioning signal, amplifying means and coupling means serially connecting the signal generator output and said audio warning signals to said power transmission lines, a vehicular proximity radio receiver including a radio frequency receiver section, a proximity audio frequency receiver section, a radio frequency receiver section power supply, a proximity audio frequency receiver section power supply, a common amplifier section, a loud speaker, said common amplifier section being normally connected to said radio frequency receiver section and to said radio frequency receiver power supply, automatic switching means responsive to receiver automatic conditioning signals received by said proximity audio frequency section to disconnect said common amplifier section from said radio frequency receiver section and said radio frequency receiver power supply and to connect said common amplifier to said proximity audio frequency receiver section and said proximity audio frequency receiver section power supply, means connecting said loud speaker to said common amplifier section output.

24. A civil emergency warning system comprising in combination with an electric power distribution network having power transmission lines for carrying low frequency current, means for producing audio warning signals, a signal generator for producing a receiver automatic conditioning signal, amplifying means and coupling means serially connecting the signal generator output and said audio warning signals to said power transmission lines, a radio frequency receiver, receiver coupling means for coupling said radio receiver to said power transmission lines, said radio frequency receiver including a radio frequency receiving section having a detector in its final stage, an audio section normally connected to said detector, a radio receiver power supply and a manual on and off switch for energizing said radio receiver, conversion means for said radio frequency receiver adapting said receiver to receive and broadcast said audio warning signals, including an audio warning signal amplifier, and automatic switching means responsive to said receiver automatic conditioning signal for disconnecting said detector from said audio section and for connecting said audio warning signal amplifier to said audio section of said receiver and for automatically by-passing said manual on and off switch to energize said receiver irrespective of the position of said manual on and off switch.

References Cited in the file of this patent

UNITED STATES PATENTS

| | | |
|---|---|---|
| 2,636,164 | Lubin et al. | Apr. 21, 1953 |
| 2,703,367 | Florman | Mar. 1, 1955 |
| 2,879,383 | Powell | Mar. 29, 1959 |
| 2,994,765 | Adam | Aug. 1, 1961 |

OTHER REFERENCES

Publication: The Cornell-Dubilier Capacitor, "Conelrad Circuits," vol. 23, No. 3, March 1958 (pp. 3–9).